Sept. 9, 1958  A. S. DOROSZ  2,850,749
SHOE HANDLING APPARATUS
Filed Sept. 26, 1955  3 Sheets-Sheet 1
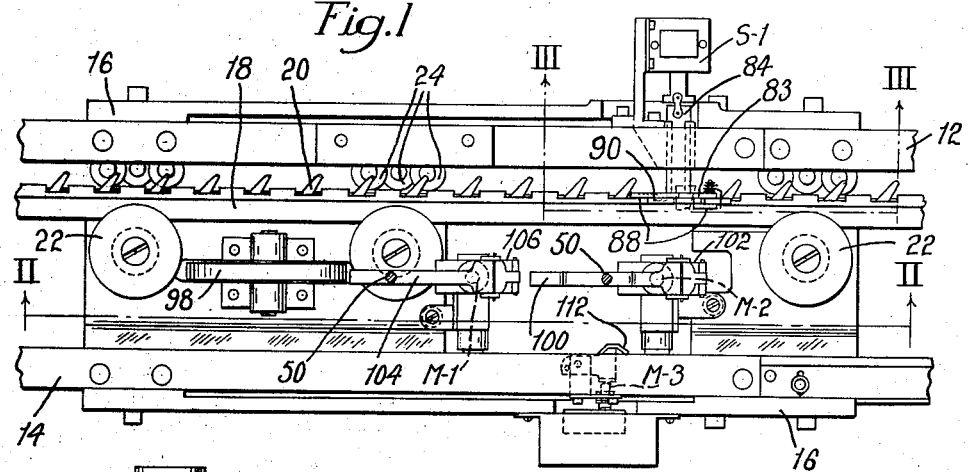
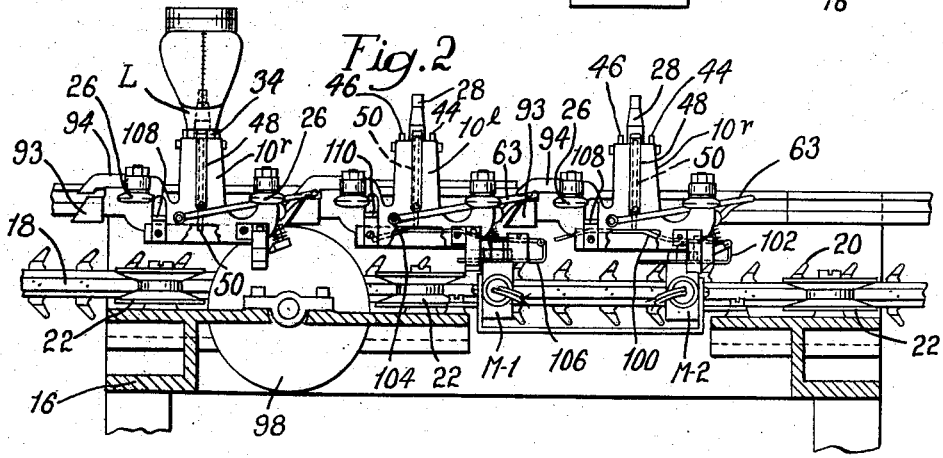
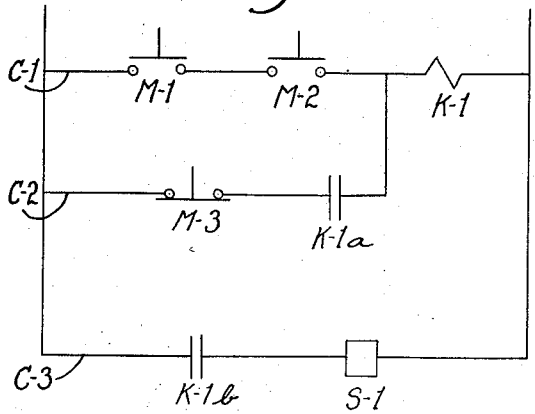
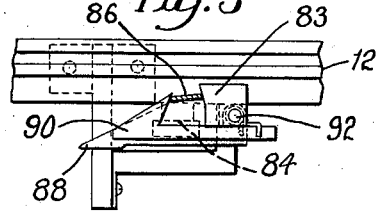
Inventor
Adolph S. Dorosz
By his Attorney

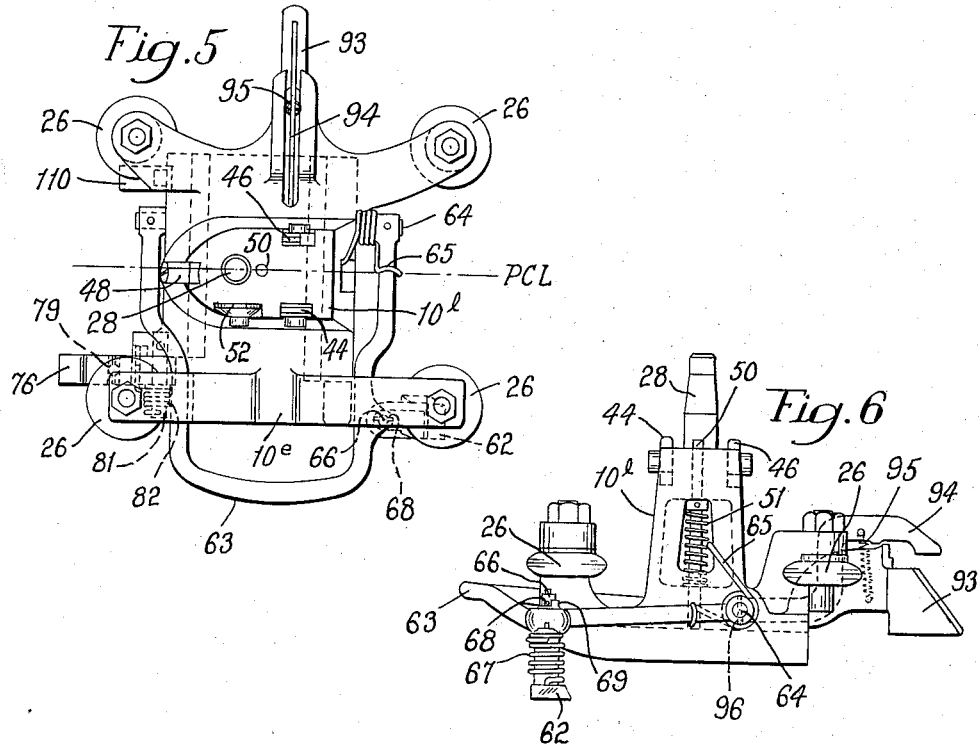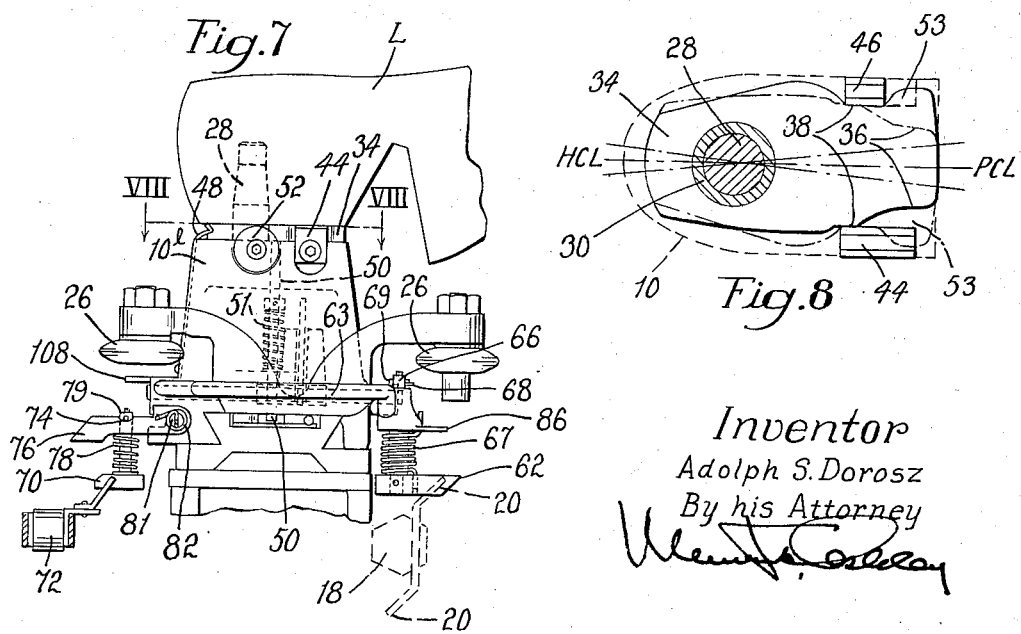

Sept. 9, 1958     A. S. DOROSZ     2,850,749
SHOE HANDLING APPARATUS

Filed Sept. 26, 1955     3 Sheets-Sheet 3

Inventor
Adolph S. Dorosz
By His Attorney

United States Patent Office 2,850,749
Patented Sept. 9, 1958

2,850,749

SHOE HANDLING APPARATUS

Adolph S. Dorosz, Beverly, Mass., assignor to United Shoe Machinery Corporation, Flemington, N. J., a corporation of New Jersey Application September 26, 1955, Serial No. 536,443

17 Claims. (Cl. 12—1)

This invention relates to shoe handling apparatus of a type in which shoes on lasts which are carried by pallets are automatically transferred along a conveyor system from a loading station to various machines in succession and back to the loading station.

With a view to eliminating machine operators, provision has been made in the above-mentioned type of system for automatically presenting the shoe-bearing pallets to each machine in a predetermined path and in a predetermined relation to its operating tools. To this end, there is associated with each machine, for which there is also provided a transfer station on an endless runway connecting all the transfer stations, a transfer mechanism by which each pallet is carried in the manner referred to above from the transfer station into the machine and back to the transfer station.

It is evident that if the shoes themselves are to be presented in the desired operative relation to the tools of each machine it is necessary that lasts over which the shoes are shaped must be accurately positioned upon the pallets. With this requirement in view, there has been developed, in connection with an improved last disclosed in United States Letters Patent No. 2,806,233, granted on September 17, 1957, upon an application of Arthur R. Hubbard et al., and characterized by the fact that it has two sets of positioning surfaces each of which is disposed in a predetermined relation to one portion or characteristic of the last, a pallet having novel positioning means which, in accordance with a feature of the present invention, is constructed and arranged to cooperate with one or the other of the sets of positioning surfaces on the last in such a manner that all lasts, whether rights or lefts, are positioned properly on the pallets in either of two predetermined positions represented by the sets of positioning surfaces.

Referring more specifically to the above-mentioned last, its positioning surfaces are formed upon the outer sides of a positioning plate which is fixed to the last, the sets of positioning surfaces being offset from each other laterally of the last and connected by inclined shoulders, the purposes of which will be referred to later. The positioning plates on right and left lasts are the same except for the fact that they are assembled one side up on a right last and the other side up on a left last and, regardless of whether the last is a right or a left last, one set of positioning surfaces is disposed symmetrically with respect to the center line or turning axis of the last while the other set is disposed symmetrically with respect to the center line of the bottom of the heel part.

With the above-mentioned last features in view, the positioning means on the illustrated pallet, in accordance with a further feature of the invention, is constituted by interchangeable members of different sizes, the members being so designed that by making one inversion of them on the pallet the latter may be made a right or left pallet (that is, one capable of accepting only a matching last) at will. By making another inversion of the positioning members on the pallets, the members are located so that they cooperate with either one or the other of the sets of positioning surfaces whereby the lasts are positioned on the pallets suitably for submitting a shoe on the last to either a forepart or a heel part operation. Thus, the positioning members are capable of being mounted on the pallets in any of four different arrangements so as to accommodate either a right or left last and to position either last in each of two predetermined positions relatively to the pallet.

Because of the unsymmetrical profile of the positioning plate resulting from the offset relation of the positioning surfaces and the inclined shoulders between them, if the assembling of a nonmatching last and pallet is attempted, interference between the positioning means on the pallet and the positioning plate on the last will prevent their complete assembly. This selective fitting of lasts and pallets is utilized in connection with control mechanism, as will be more fully pointed out later, to insure the proper matching of lasts and pallets as a prerequisite to the operation of control mechanism which is necessary for any pallet to begin its movement along the runway from the loading station.

In another aspect, the invention is concerned with control mechanism which is so designed as to require, for its proper operation, the complete assembly of lasts and pallets which cannot be effected, as stated above, without the combination of the proper last with each pallet. This control means includes, in accordance with a further feature of the invention, a sensing member yieldingly mounted in the pallet and which is moved only upon the complete assembly of a last with a matching pallet, from an inoperative position to an operative position. Thus, the control mechanism also is dependent for its proper operation upon not only the proper selection of lasts and pallets but also the complete assembling thereof.

In the illustrated apparatus, pallets carrying shoes which have been returned to the loading station are stopped by a hold back stop which, in response to the operation of the above-mentioned control mechanism, is retracted to release a pair of pallets, comprising a right and left pallet, from the loading station as soon as both pallets have been completely loaded and then is automatically restored to its operative position to intercept the succeeding right pallet on the runway at the loading station. While the sensing members of both pallets must be moved to their operative positions to actuate the control mechanism, the mechanism is actuated in response to the movement of the sensing member of the last pallet of each pair to be loaded.

The sensing member contributes not only to the operation of the control mechanism but also, in accordance with a further feature of the invention, upon the approach of each pallet to the loading station, effects the partial ejection of the last from the pallet in cooperation with ejecting means associated with the runway and disposed in the path of movement of the sensing member in converging relation thereto. Accordingly, when the sensing member, upon passing over the above-mentioned ejecting member, is moved into its inoperative position the last on the pallet is displaced out of locking engagement with locking means on the pallet which, in accordance with a further feature of the invention, holds the last securely in assembled relation upon the pallet after the last is once fully assembled with the pallet at the loading station.

Invention is also to be recognized in improved pallet driving means by which the pallets are connected to or disconnected from a continuously operated drive belt, the driving means being so constructed as to prevent a driving force in excess of a certain safe amount from being applied to any pallet which is stopped for any reason while the driving means is still engaged with the belt. In accordance with a further feature of the invention, there is associated with the pallet driving means of each pallet, and under the control thereof, means for preventing any pallet which is stopped by the one ahead of it from rebounding away from the latter, this means, being automatically operated, upon the engaging of the driving means of any pallet with the drive belt, to release the succeeding pallet.

These and other features of the invention will now be described in detail in connection with the accompanying drawings and will be pointed out in the appended claims.

In the drawings,

Fig. 1 is a plan view of a portion of a shoe handling apparatus embodying the invention;

Fig. 2 is a sectional elevation of the structure shown in Fig. 1 with pallets added thereto, the section being taken along the line II—II in Fig. 1;

Fig. 3 is a sectional front elevation of a portion of stop mechanism shown in Fig. 1, the section being taken along the line III—III in Fig. 1;

Figure 9:
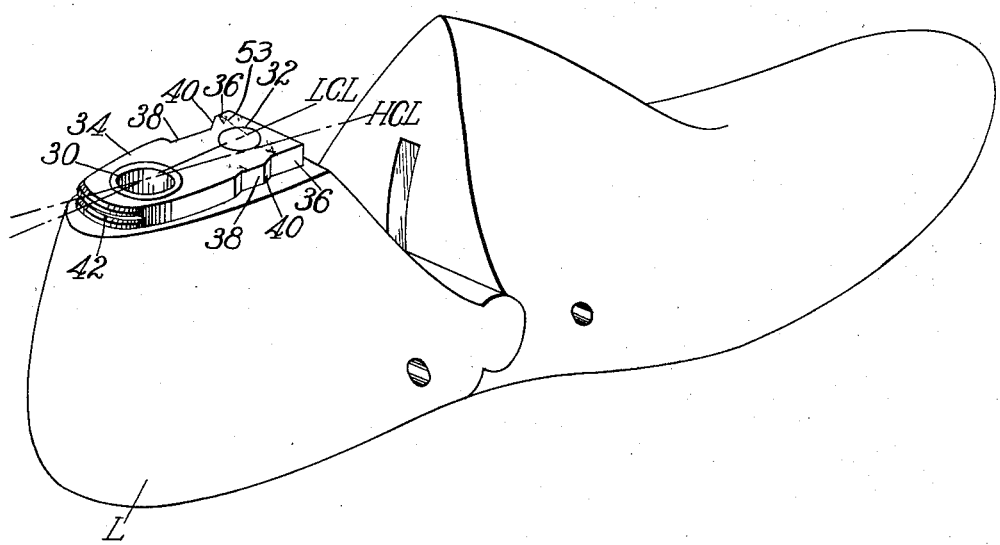

Fig. 4 diagrammatically illustrates controlling means for the stop mechanism including its electrical parts and connections;

Fig. 5 is a plan view at an enlarged scale of a pallet for holding a lasted shoe as illustrated in Fig. 2;

Fig. 6 is a side elevation of the pallet of Fig. 5 as viewed from the right;

Fig. 7 is a front elevation of the pallet of Fig. 5 and showing a last fully assembled upon the pallet;

Fig. 8 is a sectional plan view illustrating the relation between the positioning plate of a last and the pallet, the section being taken along the line VIII—VIII in Fig. 7; and Fig. 9 is a perspective view of a last having a positioning plate for positioning the last upon a pallet.

In Figs. 1 and 2 there is illustrated a portion of a conveyor system which includes a loading station. Lasts L are transported throughout this system from the loading station and back thereto on right and left pallets 10$^r$, 10$^1$ which are mounted for movement along an endless runway comprising a pair of rails 12, 14, the rails being supported with the proper spacing at the loading station upon a base 16. A continuously operated endless drive belt 18 having a series of lugs 20 extending both upwardly and downwardly therefrom drives the pallets, the belt being guided at the loading station by a series of grooved wheels 22 rotatably mounted upon the base 16 and sets of rolls 24, there being one set of rolls 24 rotatably mounted upon the base 16 opposite to each of the wheels.

Each pallet is provided with four wheels 26 which are mounted to rotate freely about vertical axes and are arranged to run in V-shaped grooves formed in the rails 12, 14. Projecting out of the top of the pallet is a last pin 28 which is received in the usual socket 30 (Fig. 9) in the heel part of the last L, the latter, whether a right or left last, being oriented upon the pallet in a predetermined position when fully assembled upon the pallet as will next be described.

The illustrated last L, as disclosed in the above-mentioned Hubbard et al. patent, has fixed upon the top of its heel part, by means of the socket 30 and a pin 32, a positioning plate 34 having formed thereupon at its forward end a set of positioning surfaces 36 which are symmetrically placed with respect to a center line LCL extending longitudinally of the last through the axis of the socket and the center of the toe end of the last. That is, the surfaces 36 are equally spaced laterally of the last at each side of the center line LCL which corresponds to the turning axis of the last. The positioning plate is also provided with a second set of positioning surfaces 38 which is offset laterally of the last from the set of positioning surfaces 36, and hence are unsymmetrically related to the center line LCL. However, the positioning surfaces 38 are equally spaced at each side of and symmetrically related to the longitudinal center line of the bottom of the heel part HCL, the angle by which the two sets of positioning surfaces 36, 38 are offset laterally from each other corresponding to the angle of swing between the forepart and heel part of the last. Inclined to and connecting the positioning surfaces 36, 38 at both sides of the plate are shoulders 40, the purpose of which, as well as that of a notch 42 formed in the rear end of the plate, will be described later.

To assemble a left last upon a left pallet 10$^1$, the pin 28 is received in the socket 30 and the last is lowered in such a position as to bring the positioning plate 34 (Fig. 8, full lines) into engagement with the top of the pallet and between a pair of lugs 44, 46 which project above the upper surface of the pallet and are fixed to the sides of the pallet equidistant from its center line PCL. The notch 42, at the rear of the plate, is brought into engagement with a spring clip 48 (Fig. 7) which is fastened to the pallet and yieldingly holds the last fully seated upon the pallet. A further purpose of the clip 48 is to hold the last so securely upon the pallet that if the pallet and last are inverted the last will not fall off the pallet.

As a result of completely assembling the last upon the pallet, a sensing rod 50, mounted for vertical yielding movement in the pallet and normally biased upwardly by a spring 51 into an inoperative position in which the upper end of the rod projects above the upper surface of the pallet, is displaced downwardly into its operative position, the lower end of the rod at this time projecting out of the bottom of the pallet, as illustrated in Fig. 7, for a purpose which will appear hereinafter.

Because of the disposition of the lugs 44, 46 upon the pallets, each pallet is adapted to hold either a right or left last for either a heel part or forepart operation, the lugs being arranged to cooperate with the positioning plate in such a manner that a right last cannot be assembled upon a left pallet, and a left last cannot be assembled upon a right pallet. To this end, and as illustrated in Figs. 5 and 8 which show the arrangement of the lugs 44, 46 on a left pallet for a heel part operation, the top portion of the lug 46 is notched at one end thereof so that the remaining part of the lug 46 which extends above the top of the pallet has one half the length of its lower portion which is received in the pallet and also is one half as long as the corresponding portion of the lug 44. The lower portions of the lugs are equal in length and are interchangeable in slots of the same size formed directly opposite to each other in the sides of the pallet. By inverting the lugs, from side to side on the pallet, from their arrangement shown in Fig. 5, the pallet is converted into a right pallet adapted for positioning a right last for a heel part operation.

When a left last is assembled upon a left pallet the set of positioning surfaces 38 (Fig. 8, full lines) is received between the lugs 44, 46, the shorter lug 46 being received in a recess at that side of the positioning plate which has an outwardly extending lobe 53. A left last is thus located in a predetermined position upon a pallet, in this case with the center line of its heel part HCL centered between the lugs 44, 46, and coincident with the center line PCL of the pallet, for the reason that the positioning surfaces 38 are centered with respect to the center line of the heel part of the last. It is to be understood that right and left lasts carry identical positioning plates, the plates being assembled either one side or the other up upon the last and for distinguishing between right and left lasts it is noted that the above-mentioned lobe 53 of the positioning plate is always at the inside of the last when viewed from above.

It will now appear that if a right last, as illustrated in Fig. 9, is placed upon a left pallet the positioning surfaces 38 cannot be received between the lugs 44, 46 because the lug 44, being larger than the recess adjacent to the lobe 53, will interfere with the lobe, as shown by the broken line in Fig. 8, and prevent the complete assembling of the last upon the pallet. For similar reasons, a left last cannot be assembled fully upon a right pallet, and thus provision is made for preventing the mismating of pallets and lasts. Furthermore, it is evident that if a last cannot be fully assembled upon a pallet, the sensing rod 50 will not be moved into its operative position.

Further to insure against improper operation of the sensing rod, each pallet is also provided with an abutment 52 (Figs. 5 and 7) in the form of a wheel which is rotatably mounted on the side of the pallet so as to project above its upper surface and in juxtaposition to the side of the positioning plate where it has the minimum spacing from the axis of the socket 30. Accordingly, the abutment 52 will not interfere with the complete assembling of a last upon a matching pallet if the last is oriented properly, that is, so that its positioning surfaces are in register with the lugs 44, 46; but if the last is placed upon the pallet in any other position the abutment interferes with the positioning plate and prevents the last from being lowered enough to depress the sensing rod.

The pallets, as illustrated herein, may be converted to accommodate lasts carrying shoes upon which forepart operations are to be performed by rearranging the lugs 44, 46, as will be described below, so that they cooperate with the positioning surfaces 36. For example, on a pallet $10^r$ (as viewed in Fig. 2) adapted to hold a right last for a forepart operation, the shorter lug 46 is installed upon the lefthand side of the pallet with the portion of the lug which projects above the pallet forward, this position of the lug being an inversion, lengthwise of the pallet, of the position of this lug on the left pallet of Fig. 5. The lug 44 is installed upon the righthand side of the pallet. Again by inverting the lugs from side to side on the pallet, the pallet is made a left pallet for receiving a left last carrying a shoe upon the forepart of which an operation is to be performed. Thus, when lasts are assembled upon right and left pallets, the lugs of which cooperate with the positioning surfaces 36, the center lines LCL of the lasts will be coincident with the center lines PCL of the pallets for the reason that the set of positioning surfaces 36 on both right and left lasts are symmetrical or centered with respect to the center lines LCL in both cases.

Mismating of lasts and pallets with the lugs 44, 46 disposed as described above, is prevented when the positioning surfaces 36 are used, by interference between the rearward portion of the lug 44 with a portion of the positioning plate 34 which is bounded by the inclined shoulder 40 on the side of the plate opposite to the lobe 53.

Each pallet is driven along the rails 12 by a lug 20 on the belt 18 through connections including a drive finger 62 (Figs. 5, 6 and 7) associated with a bail 63, the latter being fixed on a shaft 64 which is mounted to rotate freely in the pallet. The bail is biased downwardly normally to hold the drive finger within the path of the lugs 20 by a spring 65 which is coiled about the shaft 64, one end of the spring being bent over the bail, and the other being anchored to the pallet. The drive finger is fixed upon a rod 66 mounted upon the bail to turn about a vertical axis and is biased by a spring 67 so as to hold a cross pin 68 at the upper end of the rod against a stop shoulder 69 on the bail. The drive finger is thus yieldingly held in its driving position perpendicular to the path of the lugs 20. The upper end of the spring 67 is anchored to the bail, and is so arranged that its lower end tends to swing the finger 62 oppositely to the direction of movement of the belt 18, so that if driving pressure between the finger and the lug 20 engaging it exceeds the tension in the spring 67, for any reason, the finger 62 will yield. After the finger 62 has been swung from its normal driving position the outwardly bent end of the lug cams the finger upwardly over the end of the lug. Thereupon, the finger drops within the path of the succeeding lug, and the above-described action between the lugs and the finger continues so long as the progress of the pallet along the rails is blocked.

In case it is desired to drive the pallets by a drive belt or chain 72 (Fig. 7) at the front of the pallets, the pallet is provided with an auxiliary drive finger 70. This finger is yieldingly held in its operative position by a cross pin 74 which is held seated in the bottom of a shallow recess in an arm 76 by a spring 78. This spring is coiled about a rod 79 to which the cross pin and finger are fixed. It is evident that excessive driving pressure between the finger 70 and the chain 72 will cause the finger to be swung about the axis of the rod 79, as permitted by movement of the cross pin 74 up the inclined shoulders of the recess in the arm 76. The arm is pivotally mounted upon a stud 81 fixed upon the pallet and, being biased downwardly by a spring 82, may be lifted to carry the finger 70 out of driving engagement with the chain 72.

The stopping of pallets at the loading station and their release therefrom is effected by a stop 83 (Figs. 1 and 3) which is mounted upon a horizontally-movable slide 84 so as to be disposed normally within the path of movement of a deflecting plate 86 fixed upon the bail 63 of each pallet. As a pallet approaches the stop 83 (in its operative position), the plate 86 is deflected upwardly by engagement with a sloping cam 88, which is integral with the stop, so as to lift the drive finger 62 out of the path of the lugs 20, thereby disengaging the pallet from the drive belt. The pallet then advances under its own inertia until the plate 86 engages the stop 83, whereupon a latch 90, which is pivotally mounted at 92 upon the stop and is lightly biased upwardly above the cam 88 and the deflecting plate, rises behind the deflecting plate and therefore prevents any rebounding of the pallet.

When a pallet is thus stopped at the loading station, the bail 63 of the next trailing pallet engages and slides up a cam 93 at the rear of the stopped pallet, there being such a cam on each pallet, and this lifting movement of the bail causes the disengagement of this pallet from the drive belt, as described above. Rebounding of this pallet away from the leading pallet is prevented by a hook 94 on the leading pallet which will have been lowered into proximity to its cam 93 when its bail 63 was raised. The hook 94 of each pallet is pivotally mounted upon the shaft 64 and is biased downwardly toward the cam by a spring 95. A hub portion of the hook, which is bored to receive the shaft 64, is provided with a slot adapted to receive a pin 96 (Fig. 6) with some lost motion, the arrangement of the pin and slot being such as to cause the hook to be positively raised and yieldingly lowered when the bail is lowered and raised, respectively. Thus, when any pallet is stopped at the loading station, each succeeding pallet is disengaged from the drive belt by its engagement with the preceding pallet; and each pallet is prevented from rebounding from the preceding pallet by the hook 94 on the preceding pallet.

In a series of pallets on the runway every other pallet is the right pallet $10^r$ (Fig. 2), the intervening pallets being left pallets $10^l$, and the stop 83 with the control mechanism therefor is so arranged that the leading pallet stopped at the loading station is a right pallet. Upon the retraction of the stop, the leading right pallet and the next left pallet are released from the loading station in close succession and proceed along the runway. The succeeding pallets, led by a right pallet, advance toward the loading station until they are stopped by the stop 83, which will have been returned to its operative position in time to intercept at the loading station the first right pallet that succeeds the left pallet of the pair just released.

Ordinarily, all pallets approaching the loading station carry shoes which will have been operated upon and the operator's duty at this station is merely to replace such shoes with others to be operated upon. In order to facilitate this operation, the lasts are partially ejected automatically from the pallets just before they arrive at the loading station. To this end, there is rotatably mounted on the base 16 an ejector wheel 98 (Figs. 1 and 2), the upper portion of which is disposed in the path of the lower ends of the sensing rods 50, the arrangement of this structure being such that the upper periphery of the wheel converges with the path of the rods and causes them to be elevated into their inoperative positions as they pass over the wheel whereby each last is positively disengaged from the clip 48 which is so strong as to make difficult the removal of a last from a pallet by hand.

Upon fully assembling a right last with the right pallet 10$^r$ at the loading station, the sensing rod 50 lowers an arm 100 which is pivoted upon a bracket 102 fixed to a microswitch M-2, the latter being mounted upon the base 16. The arm 100 thus operates the microswitch to close a part of a circuit C-1 (Fig. 4) including a contactor coil K-1 which, when energized, results in the energizing of a solenoid S-1 for operating the slide 84 so as to retract the stop 83 from the deflecting plate 86 which engages it. When a left last is assembled on the left pallet 10$^1$ at the loading station, the sensing rod 50 of this pallet is lowered and depresses an arm 104 (Figs. 1 and 2) which is pivotally mounted on a bracket 106, the latter being fixed to a microswitch M-1 which is mounted upon the base 16. Lowering of the arm 104 closes the microswitch M-1 which, with microswitch M-2 closed, completes the circuit C-1 (Fig. 4) whereby the coil K-1 is energized. Thereupon, two normally open contactors K-1$a$ and K-1$b$ are closed, the former being included with a normally closed microswitch M-3, in a holding circuit C-2 for the coil K-1, the latter contactor K-1$b$ being included, with the solenoid S-1, in a circuit C-3. Thus, the stop 83 is retracted into its inoperative position and the release of pallets from the loading station is effected.

Retraction of the stop 83 permits the bail 63 of the leading right pallet to drop and the associated drive finger 62 to fall into engagement with the drive belt. Simultaneously with the dropping of the bail, the hook 94 of this pallet is raised away from the bail of the succeeding pallet, permitting the free advance of the leading pallet. As the cam 93 of the leading pallet moves away from the bail 63 of the succeeding pallet, the latter is re-engaged with the chain and disengaged from the next succeeding pallet. This same action occurs progressively, pallet by pallet, rearwardly of the series of pallets which previously were stopped.

Each right pallet is provided at its forward side with a control finger 108 (Fig. 2), these fingers on all right pallets being disposed at one level. Each left pallet is provided with a similar control finger 110, these fingers on all left pallets being disposed at another level, higher than that of the fingers 108. Pivotally mounted upon the outer rail 14 at the level of the fingers 110 of the left pallets is an arm 112 (Fig. 1) which is arranged to operate the microswitch M-3. When a pair of pallets departs from the loading station, the finger 110 of the trailing left pallet in passing the arm 112 causes the microswitch M-3 to be opened, thereby opening the holding circuit C-2 (Fig. 4) for the coil K-1. Thereupon the coil K-1 is de-energized, the contactor K-1$b$ is opened, and the solenoid S-1 is de-energized. Now, the slide 84 (Fig. 1) which is spring-biased toward its operative position returns thereto in time to intercept the next pallet which is a right pallet. Thus, after a pair of newly loaded pallets have departed from the loading station, the succeeding pair of pallets, carrying lasts which will already have been partially ejected therefrom by the wheel 98 and sensing rods 50, will be stopped at the loading station.

There will now be summarized the above-described structure and the various cooperative relations between the parts of this structure.

Lasts, each with its positioning plate 34 having the two sets of equally spaced positioning surfaces 36, 38 cooperate with the illustrated lugs 44, 46 in any of four different arrangements on the pallets to effect the desired positioning of the lasts, whether rights or lefts, and whether the shoe on the last is to be submitted to a heel part operation or an operation to be performed upon the toe portion or forepart. The laterally offset relation of the sets of positioning surfaces 36, 38, together with the inclined shoulders 40 extending between them, results in the upper surface of the positioning plate having an asymmetrical shape, on account of which, and the design of the lugs 44, 46, certain parts of the lugs and the plate of a last which does not match a pallet upon which it may be placed interfere with each other so as to prevent the complete assembly of such a last upon the pallet.

A last which is matched to the pallet upon which it is placed is fully assembled thereon by being forced downwardly to bring the positioning plate and the top of the pallet together, the last being held in this relation to the pallet by the yielding clip 48 which becomes seated within the notch 42. Provision is thus made both for preventing the last from falling off the pallet if the latter is inverted and for preventing the last from rising under the influence of the sensing rod 50. Moreover, the final movement of a last into fully assembled relation to a matching pallet results in the displacement of the sensing rod 50 from its inoperative position to its operative position and, as pointed out above, such operation of the sensing rod is impossible if it is attempted fully to assemble a last upon a nonmatching pallet.

Insurance against the improper operation of the sensing rod by a last which is placed upon the pallet materially out of register with the lugs 44, 46 is afforded by the abutment wheel 52 which will not permit the last to operate the sensing rod unless the last is substantially in register with the lugs.

It will now be assumed that there is a pair of pallets in readiness to be loaded at the loading station, the right pallet being arrested by the holdback stop 83 and each of the succeeding pallets being arrested by the one ahead of it. Upon the loading of the second pallet of the pair at the loading station, regardless of whether it is the right or left pallet, the circuit C-1 is closed by the microswitches M-1, M-2 and the holdback stop 83 is retracted from the deflecting plate 86 of the right pallet whereby the bail 63 of this pallet is permitted to drop, and this pallet is connected to the drive belt 18. With the dropping of the bail 63 of the leading right pallet its hook 94 is lifted from the bail of the trailing left pallet, permitting the free advance of the leading right pallet along the rails 12, 14. Upon the departure of the right pallet from the loading station, its cam 93, in moving away from the bail 63 of the following left pallet, causes the latter to be engaged with the drive belt and to be driven along the rails 12, 14, closely behind the right pallet. In a similar manner, the remaining pallets of the series, which are stopped behind the loading station, are engaged with the drive belt and are advanced toward the loading station.

Soon after the movement of the left pallet out of the loading station begins, its control finger 110 engages the arm 112 causing the microswitch M-3 to be opened and the holdback stop 83 to be released for movement into its operative position in time to intercept the next pallet, which is a right pallet, at the loading station. With the lifting of the bail 63 of this right pallet it is disengaged from the drive belt and its hook 94 is lowered into engagement with or in proximity to the upper portion of its cam 93, in readiness to engage the bail 63 of the succeeding left pallet. As this left pallet arrives at the loading station its bail 63 is elevated by engagement with the cam 93 of the preceding pallet, causing the disengagement of the left pallet from the drive belt. The bail of the left pallet is also engaged by the hook 94 of the preceding pallet whereby any rearward rebounding of the left pallet is prevented. The remaining pallets of the series advancing toward the loading station are similarly stopped one by one, each being locked to the one ahead by the hook 94 on the pallet ahead. Thus, for each pair of pallets which are released from the loading station another pair of pallets is advanced into the loading station.

As each pallet approaches the loading station it passes over the ejector wheel 98 which, upon being engaged by the sensing rod 50 elevates the latter into its inoperative position, causing the last to be disengaged from the clip 48 so that the last may be readily removed from the pallet by the operator.

Having thus described my invention, what I claim as new and desire to secure by Letters Patent of the United States is:

1. In a shoe handling apparatus, a runway having associated therewith a drive belt, last-carrying pallets mounted upon said runway for movement therealong, each of said pallets having positioning means cooperating with a last thereon to hold it in a predetermined position on the pallet, locking means on said pallet and cooperating with said last to hold it in assembled relation with said positioning means, a sensing rod yieldingly mounted in said pallet for movement into an operative position in response to the assembling of a last upon said pallet, and an ejecting member associated with said runway and having a sloping surface disposed within and converging with the path of said sensing rod when it is in its operative position, said ejecting member and sensing rod cooperating in response to movement of said pallet past said ejecting member to disengage said last from said locking means.

2. In a shoe handling apparatus, a runway having associated therewith a drive belt, last-carrying pallets mounted for movement along said runway, each pallet having mounted thereon for movement into and out of driving engagement with said belt a driving member carrying a deflecting plate, a stop associated with said runway and cooperating with said plate both to separate said driving member from said drive belt and to arrest forward movement of said pallet along said runway, solenoid operated mechanism for retracting said stop from said plate to permit the reengagement of said driving member with said drive belt, control means for actuating said mechanism comprising series-connected switches, one of said switches being located in the path of movement of that pallet which is arrested by said stop and another of said switches being disposed in the path of the succeeding pallet, means on each pallet for operating said switches to cause said stop to be moved into its inoperative position in response to the assembling of lasts upon both of the two last-mentioned pallets, and a second control means arranged to cooperate with the second one only of said two last-mentioned pallets to deenergize said mechanism whereby said stop is returned to its operative position and the forward movement of the next succeeding pallet is arrested by said stop.

3. In a shoe handling apparatus, a runway having associated therewith a drive belt, last-carrying pallets mounted for movement along said runway and having sensing rods which are displaced into an operative position upon the assembling of lasts upon the pallets, each pallet having mounted thereon for movement into and out of driving engagement with said belt a driving member carrying a deflecting plate, said member being biased toward its operative position, a stop member associated with said runway and cooperating with said plate both to disengage said driving member from said drive belt and to arrest forward movement of said pallet along said runway, mechanism for retracting said stop from said plate to permit the reengagement of said driving member with said drive belt, and control means for actuating said mechanism comprising series-connected switches, one of said switches being located in the path of movement of the sensing rod of that pallet which is arrested by said stop and another of said switches being disposed in the path of the sensing rod of the succeeding pallet whereby said stop is retracted from said plate and said driving member is engaged with said belt in response to the assembling of lasts upon the two last-mentioned pallets.

4. The combination with a last having a socket adapted to receive a last pin and positioning surfaces formed upon the sides of its heel part, of a pallet having a last pin and positioning elements cooperating with said socket and positioning surfaces, respectively, to locate a last upon the pallet, said pallet also comprising a sensing rod normally protruding from the surface of the pallet engaged by the last and mounted for movement into an operative position in response to the assembling of a last upon said pallet, said pallet also comprising an abutment mounted in overlapping relation and in juxtaposition to the portion of the side of the last assembled upon the pallet having the minimum spacing from said socket, said abutment being arranged to cooperate with the upper surface of the heel part to prevent operation of said sensing rod unless said last is oriented to bring its positioning surfaces substantially into register with said positioning elements.

5. The combination with a last, upon which is fixed a positioning plate having a socket for receiving a last pin, of a pallet having a last pin and positioning means cooperating with said socket and positioning plate, respectively, to locate upon said pallet a last mounted thereon, said pallet having yieldingly mounted therein a sensing member which is displaced into an operative position in response to the assembling of a last upon said pallet, said pallet also comprising an abutment mounted thereon beside and spaced from said pin in overlapping relation and in juxtaposition to the peripheral portion of said positioning plate which is nearest to said socket when said positioning plate is substantially in register with said positioning means whereby the operation of said sensing member is prevented by said abutment unless the last is properly oriented upon said pallet.

6. The combination with a last upon which is fixed a positioning plate having a socket arranged to receive a last pin, said plate having minimum width beside said socket, of a pallet having a last pin, and positioning means cooperating with said socket and positioning plate, respectively, to locate upon said pallet a last mounted thereon, said pallet comprising a sensing rod normally biased into an inoperative position in protruding relation to the surface of the pallet engaged by the last, said pallet having an abutment protruding beyond the surface of the pallet engaged by the last to the level of the last engaging end of said sensing rod when in its inoperative position, said abutment being disposed beside said last pin and spaced therefrom according to the said minimum width of said plate whereby the last is prevented by said abutment from operating said sensing member unless the last is oriented to bring said positioning plate into register with said positioning means.

7. The combination with a last having a positioning plate fixed upon its heel part and provided with positioning surfaces arranged in an asymmetric formation upon its opposite sides, of a pallet for holding the last comprising positioning elements cooperating with said positioning surfaces to locate the last upon the pallet, said positioning elements being arranged in an asymmetric formation which is complementary to that of said positioning surfaces whereby the last with its positioning plate in one attitude of inversion upon the last may be assembled with said positioning elements but with the plate in the other attitude of inversion upon the last, the assembly of the last with the said positioning elements is prevented by interference between said elements and said plate.

8. For use with right and left lasts having positioning plates fixed upon their heel parts, said plates being provided with positioning surfaces arranged in an asymmetric formation upon their opposite sides, said plates being alike but installed in inverted positions on right and left lasts, right and left pallets for holding the lasts comprising positioning elements cooperating with said positioning surfaces to locate the lasts upon the pallets, the positioning elements on each pallet being arranged in an asymmetric formation complementary to that of said positioning surfaces, the arrangement of said elements on each right pallet being an inversion of that of the positioning elements on each left pallet.

9. The combination with a last having a positioning plate fixed upon its heel part and provided with positioning surfaces arranged in an asymmetric formation upon its opposite sides, of a pallet for holding the last comprising a pair of positioning elements cooperating with said positioning surfaces to locate the last upon the pallet, said elements being interchangeably mounted upon opposite sides of the pallet, one of said elements having a last engaging portion at one end and being invertible lengthwise of said pallet whereby its last engaging portion may be disposed in different locations with respect to the other element.

10. The combination with a last having a positioning plate fixed upon its heel part and provided with sets of positioning surfaces which are spaced and offset from each other longitudinally and laterally, respectively, of the last, of a pallet for holding the last comprising positioning elements cooperating with said positioning surfaces to locate the last upon the pallet, one of said positioning elements being arranged to span the positioning surfaces of both sets at one side of said plate, the other of said elements being arranged to span only one positioning surface and being mounted for inversion lengthwise of said pallet whereby it may be selectively disposed in cooperative relation to a positioning surface of each of said sets.

11. The combination with a last having a positioning plate fixed upon its heel part and provided with sets of positioning surfaces which are spaced and offset from each other longitudinally and laterally, respectively, of the last, of a pallet for holding the last comprising positioning elements cooperating with said positioning surfaces to locate the last upon the pallet, one of said elements being notched at one end thereof to provide a last engaging portion at the other end thereof, the last-mentioned element being mounted for inversion upon the pallet lengthwise thereof whereby said last engaging portion may be selectively disposed in different locations with respect to the other element lengthwise of the last.

12. The combination with a last having a positioning plate fixed upon its heel part and provided with sets of positioning surfaces which are spaced and offset from each other longitudinally and laterally, respectively, of the last, of a pallet for holding the last comprising positioning elements interchangeably mounted thereon and cooperating with said positioning surfaces to locate the last upon the pallet, the last engaging portion of one of said elements extending from its midpoint to one end thereof, the last mentioned element being mounted for inversion upon said pallet whereby its last engaging portion may be selectively disposed opposite to the forward and rearward portions of the other element.

13. For use in a shoe handling apparatus comprising a runway having associated therewith a drive belt, last-carrying pallets mounted for movement along said runway each pallet having a driving member mounted thereon for movement into and out of driving relation with said belt, coupling means at the rear of each pallet disposed in the path of and cooperating with the driving member of an overtaking pallet to move it out of operative relation to said belt, and connections between said driving member and coupling means for closing and opening said coupling means in response to movement of said driving member out of and into, respectively, operative relation to said belt.

14. For use in a shoe handling apparatus comprising a runway having associated therewith a drive belt, last-carrying pallets mounted for movement along said runway, each pallet having hinged thereon a driving member biased into driving relation with said belt, each pallet also having at the rear thereof coupling means for holding the driving member of an overtaking pallet, and connections operated by said driving member for opening said coupling means to release the drive member of the overtaking pallet in response to movement of said driving member into operative relation to said belt, said connections being constructed and arranged to close said coupling means in response to movement of said driving member out of operative relation to said belt.

15. For use in a shoe handling apparatus comprising a runway having associated therewith a drive belt, last-carrying pallets mounted for movement along said runway each pallet having a drive member mounted thereon for movement into and out of operative relation to said drive belt, each pallet having coupling means at the rear thereof comprising a hook and a cam shoulder, said cam shoulder being arranged to cooperate with the drive member of an overtaking pallet to move that drive member out of operative relation to said drive belt, and connections on each pallet between its drive member and hook for urging the latter toward and retracting it from said cam shoulder in response to movement of said driving member out of and into, respectively, operative relation to said drive belt.

16. For use in shoe handling apparatus comprising a runway with which is associated a drive belt, last-supporting pallets mounted for movement along said runway, a driving member for each pallet mounted to swing thereon into and out of driving relation with said driving belt, each pallet also having coupling means comprising a cam soulder and a hook disposed at the rear thereof in the path of the driving member of the succeeding pallet, the driving member and hook of each pallet being mounted to swing about a common axis, connections between said driving member and hook for retracting said hook from its associated cam shoulder in response to movement of said driving member into operative relation with said driving belt, and means for biasing said driving member and said hook into operative relation to said driving belt and said cam shoulder, respectively.

17. For use in a shoe handling apparatus comprising a runway with which is associated a driving belt, a last-supporting pallet mounted for movement along said runway, said pallet comprising a driving member having rotatably mounted thereon a shaft from which there projects radially thereof a finger adapted to be engaged by said driving belt, connections between said shaft and said driving member for positioning said finger in operative relation to said driving belt, said connections comprising a pin on said shaft arranged to engage a shoulder on said member and a spring acting upon said shaft to hold said pin and shoulder in engagement with each other whereby rotation of said shaft in response to driving pressure exerted upon said finger by said driving belt is resisted.

References Cited in the file of this patent

UNITED STATES PATENTS 1,887,753    Evans _____ Nov. 15, 1932